(12) United States Patent
van Borselen et al.

(10) Patent No.: US 7,986,586 B2
(45) Date of Patent: Jul. 26, 2011

(54) METHOD FOR DEGHOSTING MARINE SEISMIC STREAMER DATA WITH IRREGULAR RECEIVER POSITIONS

(75) Inventors: Roald G. van Borselen, Voorschoten (NL); Peter M. van den Berg, Pijnacker (NL); Jacob T. Fokkema, Schiedam (NL)

(73) Assignee: PGS Geophysical AS, Lysaker (NO)

( * ) Notice: Subject to any disclaimer, the term of this patent is extended or adjusted under 35 U.S.C. 154(b) by 547 days.

(21) Appl. No.: 12/082,006

(22) Filed: Apr. 8, 2008

(65) Prior Publication Data

US 2009/0251992 A1 Oct. 8, 2009

(51) Int. Cl.
*G01V 1/00* (2006.01)
(52) U.S. Cl. ............................................ 367/24; 367/38
(58) Field of Classification Search .................. 367/15, 367/21, 24
See application file for complete search history.

(56) References Cited

U.S. PATENT DOCUMENTS

| | | | |
|---|---|---|---|
| 4,752,916 A | 6/1988 | Loewenthal | |
| 6,477,470 B2 * | 11/2002 | Fokkema et al. | 702/17 |
| 6,654,694 B2 | 11/2003 | Fokkema et al. | |
| 6,747,913 B2 | 6/2004 | Fokkema et al. | |
| 7,526,418 B2 * | 4/2009 | Pita et al. | 703/10 |
| 2005/0128872 A1 | 6/2005 | Valero et al. | |
| 2006/0291328 A1 * | 12/2006 | Robertsson et al. | 367/24 |
| 2008/0312878 A1 | 12/2008 | Robertsson et al. | |

FOREIGN PATENT DOCUMENTS

| | | |
|---|---|---|
| EP | 0367270 | 10/1989 |
| GB | 2 404 025 | 1/2005 |
| GB | 2424951 | 10/2006 |
| SU | 1223345 | 6/2005 |
| WO | WO 82/00365 | 2/1982 |
| WO | WO 00/41005 | 7/2000 |
| WO | WO 02/44758 | 6/2002 |
| WO | WO 2005/121837 | 12/2005 |

OTHER PUBLICATIONS

Lai, "Physically Based Adaptive Preconditioning for Early Vision", IEEE Transactions on Pattern Analysis and Machine Intelligence, vol. 19, No. 6, Jun. 1997.*
Mark Miller, Nick Kingsbury, Richard Hobbs, (2005), "Seismic Imaging Using Complex Wavelets", Proceedings of the IEEE International Conference on Acoustics, Speech and Signal Processing ICASSP, pp. 557-560.
C. Knezu, Examiner, Austrian Patent Office Search Report for Singapore patent application, Sep. 8, 2009.
Anatoly Pavlovich Sysoev, (2005), "Method of development of 3D seismic-geological models based on the data of multiscale seismic survey", Synopsis, Novosibirsk, pp. 2, 10, 13-16, 22.
T. Vladimirova, Eurasian Patent Office Search Report, Jun. 14, 2009.
European Search Report and Search Opinion, mailing date of Sep. 23, 2010.
Roald Van Borselen, Rob Hegge, Michel Schonewille, (2004), "True 3D Data Driven Multiple Removal: Acquisition and Processing Solutions", Offshore Technology Conference,p. 1-11.

(Continued)

*Primary Examiner* — Jack Keith
*Assistant Examiner* — Krystine Breier

(57) ABSTRACT

Seismic data are obtained for each seismic source activation in a marine streamer and for each frequency, after being transformed to a spectral domain. An iterative conjugate gradient scheme, using a physically-based preconditioner, is applied to the transformed seismic data, to provide a least squares solution to a normal set of equations for a deghosting system of equations. The solution is inverse-transformed back to a space-time domain to provide deghosted seismic data.

12 Claims, 4 Drawing Sheets

OTHER PUBLICATIONS

A.G.J. Sevink, G.C. Herman, (1994), "Fast iterative solution of sparsely sampled seismic inverse problems", Inverse Problems, vol. 10, p. 937-948.

X.H. Campman, G.C. Herman, E. Muyzert, (2006), "Suppressing near-receiver scattered waves from seismic land data", Geophysics vol. 71, No. 4, p. 121-128.

Michael Zhdanov, (2002), "Geophysical inverse theory and regularization problems", Elsevier, Chapter II.

Peter M. Van Den Berg, (1984), "Iterative computational techniques in scattering based upon the integrated square error criterion", IEEE, vol. AP-32, No. 10, p. 1063-1071.

R.G. Van Borselen, J.T. Fokkema, P.M. Van Den Berg, (1996), "Removal of surface-related wave phenomena—the marine case", Geophysics, vol. 61, No. 1, p. 202-210.

Tamas Nemeth, Chengjun Wu, Gerard T. Schuster, (1999), "Least-squares migration of incomplete reflection data", Geophysics, vol. 64, No. 1, p. 208-221.

* cited by examiner

METHOD FOR DEGHOSTING MARINE SEISMIC STREAMER DATA WITH IRREGULAR RECEIVER POSITIONS

CROSS-REFERENCES TO RELATED APPLICATIONS

Not Applicable

FEDERALLY SPONSORED RESEARCH OR DEVELOPMENT

Not Applicable

SEQUENCE LISTING, TABLE, OR COMPUTER LISTING

Not Applicable

BACKGROUND OF THE INVENTION

1. Field of the Invention

This invention relates generally to the field of geophysical prospecting. More particularly, the invention relates to the field of deghosting marine seismic streamer data.

2. Description of the Related Art

In the oil and gas industry, geophysical prospecting is commonly used to aid in the search for and evaluation of subterranean formations. Geophysical prospecting techniques yield knowledge of the subsurface structure of the earth, which is useful for finding and extracting valuable mineral resources, particularly hydrocarbon deposits such as oil and natural gas. A well-known technique of geophysical prospecting is a seismic survey. In a land-based seismic survey, a seismic signal is generated on or near the earth's surface and then travels downward into the subsurface of the earth. In a marine seismic survey, the seismic signal may also travel downward through a body of water overlying the subsurface of the earth. Seismic energy sources are used to generate the seismic signal which, after propagating into the earth, is at least partially reflected by subsurface seismic reflectors. Such seismic reflectors typically are interfaces between subterranean formations having different elastic properties, specifically sound wave velocity and rock density, which lead to differences in acoustic impedance at the interfaces. The reflected seismic energy is detected by seismic sensors (also called seismic receivers) at or near the surface of the earth, in an overlying body of water, or at known depths in boreholes and recorded.

The resulting seismic data obtained in performing a seismic survey is processed to yield information relating to the geologic structure and properties of the subterranean formations in the area being surveyed. The processed seismic data is processed for display and analysis of potential hydrocarbon content of these subterranean formations. The goal of seismic data processing is to extract from the seismic data as much information as possible regarding the subterranean formations in order to adequately image the geologic subsurface. In order to identify locations in the Earth's subsurface where there is a probability for finding petroleum accumulations, large sums of money are expended in gathering, processing, and interpreting seismic data. The process of constructing the reflector surfaces defining the subterranean earth layers of interest from the recorded seismic data provides an image of the earth in depth or time.

The image of the structure of the Earth's subsurface is produced in order to enable an interpreter to select locations with the greatest probability of having petroleum accumulations. To verify the presence of petroleum, a well must be drilled. Drilling wells to determine whether petroleum deposits are present or not, is an extremely expensive and time-consuming undertaking. For that reason, there is a continuing need to improve the processing and display of the seismic data, so as to produce an image of the structure of the Earth's subsurface that will improve the ability of an interpreter, whether the interpretation is made by a computer or a human, to assess the probability that an accumulation of petroleum exists at a particular location in the Earth's subsurface.

The appropriate seismic sources for generating the seismic signal in land seismic surveys may include explosives or vibrators. Marine seismic surveys typically employ a submerged seismic source towed by a ship and periodically activated to generate an acoustic wavefield. The seismic source generating the wavefield may be of several types, including a small explosive charge, an electric spark or arc, a marine vibrator, and, typically, a gun. The seismic source gun may be a water gun, a vapor gun, and, most typically, an air gun. Typically, a marine seismic source consists not of a single source element, but of a spatially-distributed array of source elements. This arrangement is particularly true for air guns, currently the most common form of marine seismic source.

The appropriate types of seismic sensors typically include particle velocity sensors, particularly in land surveys, and water pressure sensors, particularly in marine surveys. Sometimes particle displacement sensors, particle acceleration sensors, or pressure gradient sensors are used in place of or in addition to particle velocity sensors. Particle velocity sensors and water pressure sensors are commonly known in the art as geophones and hydrophones, respectively. Seismic sensors may be deployed by themselves, but are more commonly deployed in sensor arrays. Additionally, pressure sensors and particle velocity sensors may be deployed together in a marine survey, collocated in pairs or pairs of arrays.

In a typical marine seismic survey, a seismic survey vessel travels on the water surface, typically at about 5 knots, and contains seismic acquisition equipment, such as navigation control, seismic source control, seismic sensor control, and recording equipment. The seismic source control equipment causes a seismic source towed in the body of water by the seismic vessel to actuate at selected times. Seismic streamers, also called seismic cables, are elongate cable-like structures towed in the body of water by the seismic survey vessel that tows the seismic source or by another seismic survey ship. Typically, a plurality of seismic streamers are towed behind a seismic vessel. The seismic streamers contain sensors to detect the reflected wavefields initiated by the seismic source and reflected from reflecting interfaces. Conventionally, the seismic streamers contain pressure sensors such as hydrophones, but seismic streamers have been proposed that contain water particle velocity sensors such as geophones or particle acceleration sensors such as accelerometers, in addition to hydrophones. The pressure sensors and particle motion sensors may be deployed in close proximity, collocated in pairs or pairs of arrays along a seismic cable.

After the reflected wave reaches the streamer cable, the wave continues to propagate to the water/air interface at the water surface, from which the wave is reflected downwardly, and is again detected by the hydrophones in the streamer cable. The water surface is a good reflector and the reflection coefficient at the water surface is nearly unity in magnitude and is negative in sign for pressure signals. The waves reflected at the surface will thus be phase-shifted 180 degrees relative to the upwardly propagating waves. The downwardly propagating wave recorded by the receivers is commonly referred to as the surface reflection or the "ghost" signal. Because of the surface reflection, the water surface acts like a filter, which creates spectral notches in the recorded signal, making it difficult to record data outside a selected bandwidth. Because of the influence of the surface reflection, some frequencies in the recorded signal are amplified and some frequencies are attenuated.

Maximum attenuation will occur at frequencies for which the propagation distance between the detecting hydrophone and the water surface is equal to one-half wavelength. Maximum amplification will occur at frequencies for which the propagation distance between the detecting hydrophone and the water surface is one-quarter wavelength. The wavelength of the acoustic wave is equal to the velocity divided by the frequency, and the velocity of an acoustic wave in water is about 1500 meters/second. Accordingly, the location in the frequency spectrum of the resulting spectral notch is readily determinable. For example, for a seismic streamer at a depth of 7 meters, and waves with vertical incidence, maximum attenuation will occur at a frequency of about 107 Hz and maximum amplification will occur at a frequency of about 54 Hz.

A particle motion sensor, such as a geophone, has directional sensitivity, whereas a pressure sensor, such as a hydrophone, does not. Accordingly, the upgoing wavefield signals detected by a geophone and hydrophone located close together will be in phase, while the downgoing wavefield signals will be recorded 180 degrees out of phase. Various techniques have been proposed for using this phase difference to reduce the spectral notches caused by the surface reflection and, if the recordings are made on the seafloor, to attenuate water borne multiples. It should be noted that an alternative to having the geophone and hydrophone co-located, is to have sufficient spatial density of sensors so that the respective wavefields recorded by the hydrophone and geophone can be interpolated or extrapolated to produce the two wavefields at the same location.

Currently in the art of geophysical marine seismic prospecting, a vessel tows very long streamers which have many seismic receivers, typically hydrophones, attached. These receivers register a portion of a scattered acoustic wavefield originated from the sounding of a seismic source. The acoustic wavefield generated by the seismic source is scattered by reflections and refractions in the Earth. Because these streamers are very long, have many receivers, and are towed behind a moving vessel, the coverage in the sail, or inline, direction is very large.

In conventional marine seismic acquisition, the receivers of the streamer are located in so-called array configurations at a particular depth position below the sea surface. This enforcement at a fixed horizontal level is achieved by standard methods. Because of this arrangement, the so-called primary reflection, the direct response from source to subsurface and subsequently to the receivers, is clouded by the so-called ghost reflection, from the wave that travels from source to subsurface and subsequently via the sea surface to the receivers.

Removing the ghost reflection from marine seismic data is the first stage in pre-processing the data to increase the resolving power. This procedure is known as "deghosting". In present-day marine seismic acquisitions, the positions of the receivers are recorded. For receivers in a streamer parallel to the water surface, deghosting can be carried out by a relatively simple algebraic operation carried out in the spectral domain representation of the recorded data. Here, the depth of the receivers in the seismic streamer is the only physical input parameter.

The standard deghosting procedure is conditioned on the receivers being positioned on a horizontal level parallel to the sea surface. In practice, it is difficult to keep a long streamer with receivers on a constant vertical depth level. Further, an example of a purposefully non-horizontal streamer is the so-called slant streamer. However, when the receivers are irregularly positioned both in the horizontal direction and vertical direction, the standard processing fails or at best gives an approximate solution.

Thus, a need exists for a method for deghosting marine seismic data recorded at arbitrary vertical and horizontal receiver positions. Preferably, the method should operate without any prior knowledge of the subsurface.

BRIEF SUMMARY OF THE INVENTION

The invention is a method for deghosting seismic data recorded from marine streamers with irregular receiver positions. Seismic data are obtained for each seismic source activation in the marine streamer and for each frequency, after being transformed to a spectral domain. An iterative conjugate gradient scheme, using a physically-based preconditioner, is applied to the transformed seismic data, to provide a least squares solution to a normal set of equations for a deghosting system of equations. The solution is inverse-transformed back to a space-time domain to provide deghosted seismic data.

BRIEF DESCRIPTION OF THE DRAWINGS

The invention and its advantages may be more easily understood by reference to the following detailed description and the attached drawings, in which.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

The invention is a method for deghosting marine seismic streamer data recorded at arbitrary receiver positions, with the provision that the depth coordinates are uniquely related to the horizontal coordinates. This provision precludes vertical receiver cables. In modern marine acquisition system, this receiver position information is recorded. Considering the deghosting procedure as the solution of a Fourier-type system of equations shows that the solution derives from an inversion of a system of equations with a well-defined Fourier kernel. Indeed for the case of the horizontal cable the system of equations reduces to the simple case of an algebraic operator. On the other hand, for the case of a streamer with varying depth levels (single valued at each horizontal position), deghosting can be achieved with a robust least-squares solution of the system of equations, where now all the receiver depths serve as physical input parameters to build the kernel of the system.

The invention operates without any a priori knowledge of the subsurface. The deghosting operation is performed on the recorded data for every shot separately. For every frequency it comprises of a method for solving a system of equations. Solution of the system of equations is obtained using a preconditioned conjugate gradient iterative method. The preconditioner is based on the physics of the problem at hand, rather than the mathematics, as conventional. As an efficient preconditioner, the inverse of the horizontal streamer is employed, since an irregular non-horizontal streamer can be treated as a perturbation of the regular horizontal streamer. A feature of an irregular streamer is lower insensitivity of the deghosting procedure to fundamental zero information at the notches in the frequency domain.

Figure 1:
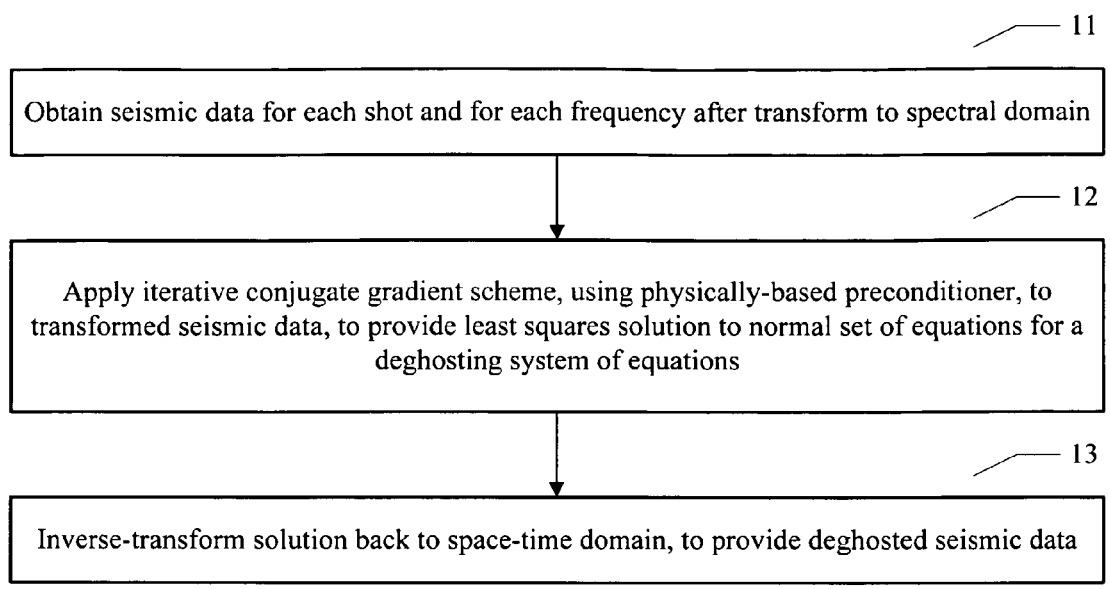
FIG. 1 is a flowchart illustrating a first embodiment of the invention for deghosting marine seismic streamer data recorded at arbitrary receiver positions.

FIG. 1 is a flowchart illustrating a first embodiment of the invention for deghosting marine seismic streamer data recorded at arbitrary receiver positions.

In block 11, seismic data are obtained for each seismic source activation and for each frequency after being transformed to a spectral domain.

In block 12, an iterative conjugate gradient scheme, using a physically-based preconditioner, is applied to the transformed seismic data, to provide a least squares solution to a normal set of equations for a deghosting system of equations.

In block 13, the seismic data are inverse-transformed back to a space-time domain to provide deghosted seismic data.

Figure 2:
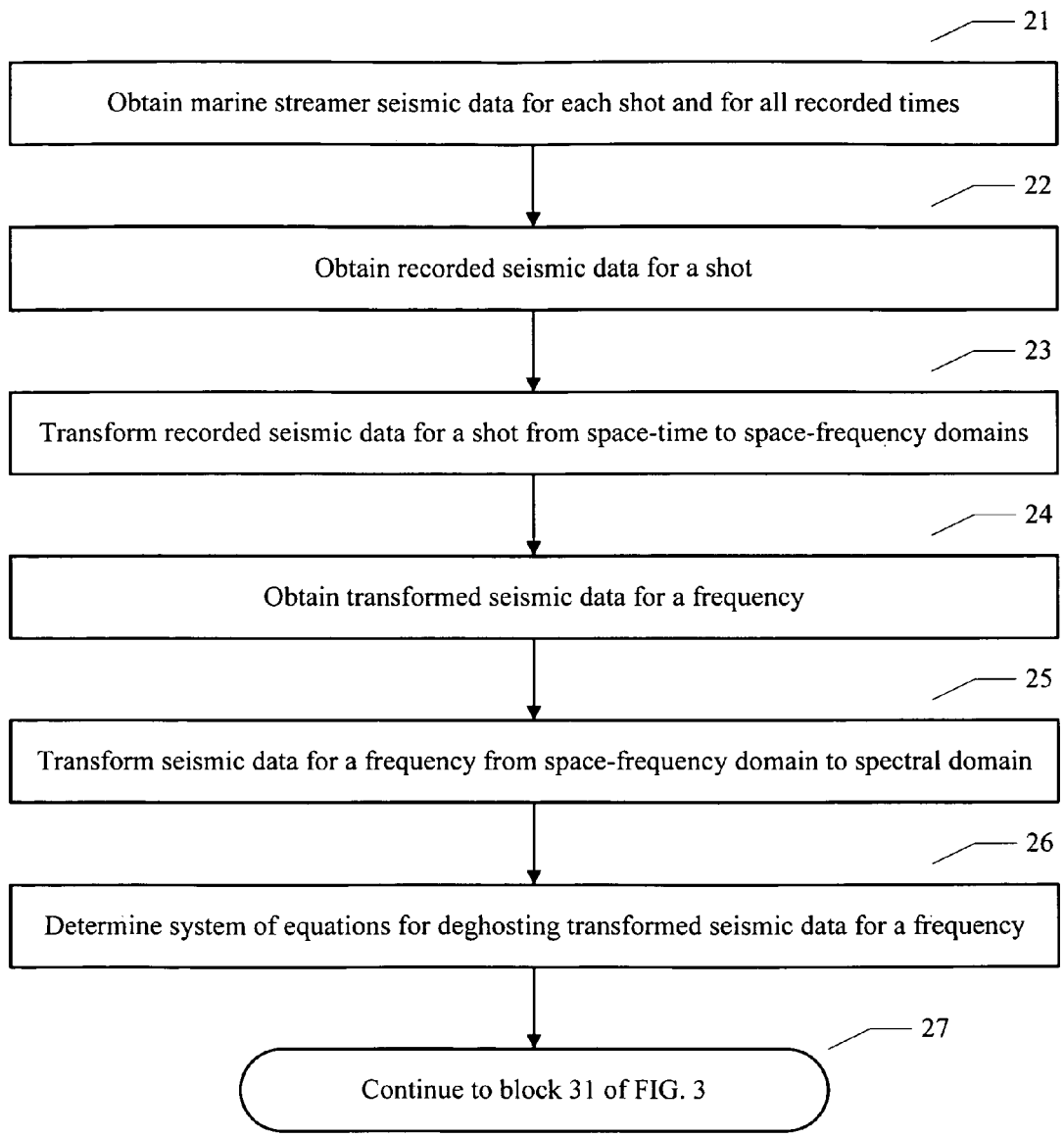
FIG. 2 is a flowchart illustrating an initial portion of a second embodiment of the invention for deghosting marine seismic streamer data recorded at arbitrary receiver positions.

FIG. 2 is a flowchart illustrating an initial portion of a second embodiment of the invention for deghosting marine seismic streamer data recorded at arbitrary receiver positions. The final portion will be discussed below with reference to the flowchart in FIG. 3.

In block 21, seismic data recorded with a marine streamer are obtained. The receiver data for each shot (seismic source activation) position, and for all recorded times t, is taken as input seismic data. The spatial position of the receivers in a Cartesian coordinate frame is given by $x^R = (x_1^R, x_2^R, x_3^R)$. In the invention, the receiver depth $x_3^R = x_3^R(x_1^R, x_2^R)$ is a single-valued function of the horizontal coordinates $x_1^R$ and $x_2^R$. Thus, the streamers are not vertical, but not necessarily horizontal. Further, in the invention, the horizontal coordinates $x_1^R$ and $x_2^R$ can be irregularly-positioned. Thus, the horizontal positions of the receivers in the streamers are not necessarily in a regular grid pattern.

In block 22, recorded seismic data for a shot are obtained from the seismic data obtained in block 21.

In block 23, the recorded seismic data for a shot from block 22 are temporally transformed from the space-time domain to the space-frequency domain. In an embodiment of the invention, the scattered wave field $p^{sct}$ at the receiver locations is transformed from the space-time $(x_1^R, x_2^R, x_3^R, t)$ domain to the space-frequency $(x_1^R, x_2^R, x_3^R, s)$ domain, so:

$$p^{sct} = p^{sct}(x_{1,q}^R, x_{2,r}^R, x_3^R; s) \qquad (1)$$

where $$s = j\omega = j2\pi f, \qquad$$

and $p^{sct}$ is the scattered acoustic wavefield in the space-frequency domain, $x_{1,q}^R$ is an in-line receiver coordinate, q is an in-line receiver number, $x_{2,r}^R$ is a cross-line receiver coordinate, r is a cross-line receiver number, $x_3^R$ is receiver depth as a function of $x_{1,q}^R$ and $x_{2,r}^R$, s is the complex Laplace transform parameter, j is the imaginary unit $\sqrt{-1}$, $\omega$ is circular frequency, and f is frequency.

This transform of the scattered wave field $p^{sct}$ at the receiver locations is done for each shot position and can be accomplished by applying well-known transforms, such as standard Fourier transforms.

In block 24, transformed seismic data from block 23 are obtained for a frequency f.

In block 25, the transformed seismic data for a frequency from block 24 are transformed from the space-frequency domain to the spectral domain. In an embodiment of the invention, the scattered wave field $p^{sct}$ is transformed from the space-frequency domain $(x_1^R, x_2^R, x_3^R, s)$ to the spectral domain $(s\alpha_n, s\beta_m, x_3^R, s)$ by:

$$P_{n,m}^{sct} = \Delta x_1^R \Delta x_2^R \sum_{q=-\frac{1}{2}N+1}^{\frac{1}{2}N} \sum_{r=-\frac{1}{2}M+1}^{\frac{1}{2}M} \exp(js\alpha_n x_{1,q}^R + js\beta_m x_{2,r}^R) p^{sct}, \qquad (2)$$

where:

$$s\alpha_n = n\Delta(s\alpha), \quad s\beta_m = m\Delta(s\beta), \qquad (3)$$

and:

$$\Delta(s\alpha) = \frac{2\pi}{N\Delta x_1^R}, \quad \Delta(s\beta) = \frac{2\pi}{M\Delta x_2^R}. \qquad (4)$$

Here, $P_{n,m}^{sct}$, is the scattered acoustic wavefield in the spectral domain, n is an in-line spectral number, m is a cross-line spectral number, $\Delta x_1^R$ is in-line receiver sampling distance. $\Delta x_2^R$ is cross-line receiver sampling distance, $js\alpha_n$ is an in-line spectral Fourier parameter, $\Delta(s\alpha)$ is in-line spectral sampling distance, $js\beta_m$ is a cross-line spectral Fourier parameter, $\Delta(s\beta)$ is cross-line spectral sampling distance, N is total number of in-line receivers, and M is total number of cross-line receivers.

In block 26, a system of equations is determined for deghosting the transformed seismic data for a frequency from block 25. Since the receiver locations are located arbitrarily, the wavefield in the spectral domain cannot be determined explicitly. Therefore, the deghosting procedure of the invention comprises solving a system of equations. For the arbitrary receiver positions $x^R = (x_{1,q}^R, x_{2,r}^R, x_{3,q,r}^R)$ in the spectral domain, the depths of the receivers on a non-horizontal streamer are given by a single-valued function of the horizontal receiver coordinates. Specifically, the receiver depth is written as $x_{3,q,r}^R = x_3^R(x_{1,q}^R, x_{2,r}^R)$. In modern marine acquisition systems, this receiver position information is recorded. The deghosting operation can then be compactly written as the solution of a system of equations:

$$\sum_{n=-\frac{1}{2}N+1}^{\frac{1}{2}N} \sum_{m=-\frac{1}{2}M+1}^{\frac{1}{2}M} K_{q,r;n,m} P_{n,m}^{dgh} = p_{q,r}^{sct}, \qquad (5)$$

$$q = -\frac{1}{2}N+1, \ldots, \frac{1}{2}N, r = -\frac{1}{2}M+1, \ldots, \frac{1}{2}M,$$

in which the system matrix $K_{q,r;n,m}$ is given by $$K_{q,r;n,m} =$$

$$\frac{\Delta(s\alpha)\Delta(s\beta)}{4\pi^2} \sum_{n=-\frac{1}{2}N+1}^{\frac{1}{2}N} \sum_{m=-\frac{1}{2}M+1}^{\frac{1}{2}M} \exp(-js\alpha_n x_{1,q}^R - js\beta_m x_{2,r}^R) 2\sinh(s\Gamma_{n,m} x_3^R).$$

Here, the unknown vector $P_{n,m}^{dgh}$ is the deghosted acoustic wavefield at zero depth and is given in the spectral domain as:

$$p_{n,m}^{dgh} = p_{n,m}^{dgh}(s\alpha_n, s\beta_m, 0; s) \qquad (7)$$

the known vector $p_{q,r}^{sct}$ is the recorded seismic data in the space-frequency domain, given as:

$$p_{q,r}^{sct} = p^{sct}(x_{1,q}^R, x_{2,r}^R, x_{3,q,r}^R; s), \qquad (8)$$

and the vertical propagation coefficient $s\Gamma_{n,m}$ is:

$$s\Gamma_{n,m} = j\sqrt{\left(\frac{2\pi f}{c}\right)^2 - (s\alpha_n)^2 - (s\beta_m)^2}, \qquad (9)$$

where c is acoustic wave speed in water.

Figure 3:
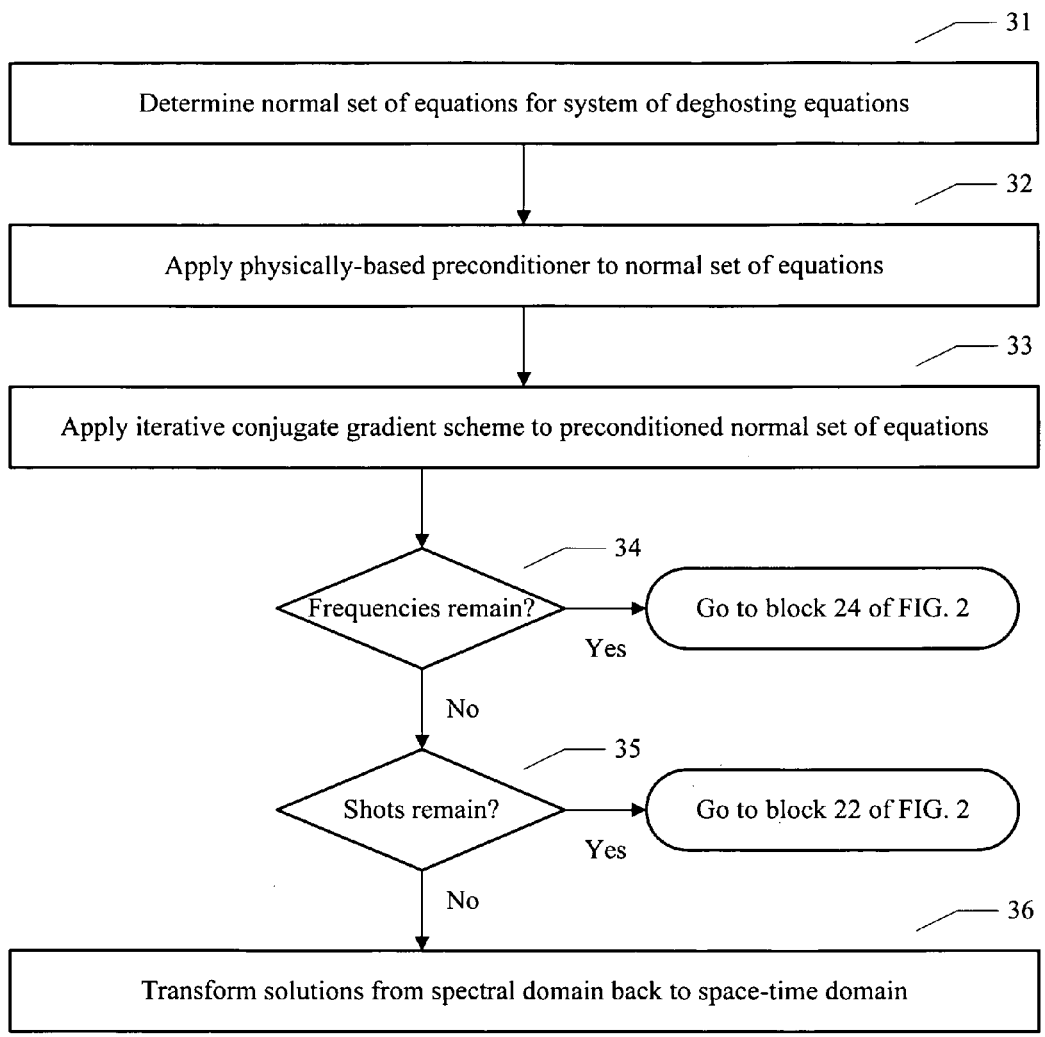
FIG. 3 is a flowchart illustrating a final portion of a second embodiment of the invention for deghosting marine seismic streamer data recorded at arbitrary receiver positions, begun in FIG. 2.

In block 27, the process continues on to block 31 of FIG. 3 to solve the system of equations determined in block 26.

FIG. 3 is a flowchart illustrating a final portion of a second embodiment of the invention for deghosting marine seismic streamer data recorded at arbitrary receiver positions. The final portion continues the initial process discussed above with reference to the flowchart in FIG. 2.

In block 31, a normal set of equations is determined from the set of deghosting equations in block 26 of FIG. 2. Since the known vector $p_{q,r}^{sct}$ is defined in the space-frequency domain and the unknown vector $P_{n,m}^{dgh}$ is defined in the spectral domain, a least-squares solution in the space-frequency domain is employed in the embodiment of the invention. Both sides of Equation (5) are multiplied by the complex conjugate of the system matrix $K_{q,r;n',m'}$ and the results are summed over all values of the in-line and cross-line receiver numbers q and r, respectively. After interchanging the latter summation over q and r and the summation over n and m, a system of normal equations is obtained, as follows:

$$\sum_{n=-\frac{1}{2}N+1}^{\frac{1}{2}N} \sum_{m=-\frac{1}{2}M+1}^{\frac{1}{2}M} A_{n',m';n,m} P_{n,m}^{dgh} = B_{n',m'}, \qquad (10)$$

$$n' = -\frac{1}{2}N+1, \ldots, \frac{1}{2}N, \; m' = -\frac{1}{2}M+1, \ldots, \frac{1}{2}M.$$

Here, the matrix $A_{n',m';n,m}$ is given by $$A_{n',m';n,m} = \sum_{q=-\frac{1}{2}N+1}^{\frac{1}{2}N} \sum_{r=-\frac{1}{2}M+1}^{\frac{1}{2}M} \overline{K_{q,r;n',m'}} K_{q,r;n,m}, \qquad (11)$$

and the known vector $B_{n',m'}$ is given by $$B_{n',m'} = \sum_{q=-\frac{1}{2}N+1}^{\frac{1}{2}N} \sum_{r=-\frac{1}{2}M+1}^{\frac{1}{2}M} \overline{K_{q,r;n',m'}} p_{q,r}^{sct}, \qquad (12)$$

where n and n' are in-line spectral numbers, m and m' are cross-line spectral numbers, and the overline above the system matrix $K_{q,r;n',m'}$ designates complex conjugation.

The main processing in the invention comprises the solution of this linear set of normal equations in Equation (10). The solution is of a general nature for existing streamer configurations, but can accommodate new streamer configurations, such as slant streamers.

Note that a conventional marine streamer, a strictly horizontal streamer configuration, is just a special case of the general case handled by the invention. In this conventional (horizontal) case, the receiver depth position $x_3^R$ is constant and the inversion of the system of equations reduces to the standard deghosting procedure. The system of equations can be solved by an inverse discrete Fourier transform. Equations (5) and (6) become the system of equations:

$$\frac{\Delta(s\alpha)\Delta(s\beta)}{4\pi^2} \qquad (13)$$

$$\sum_{n=-\frac{1}{2}N+1}^{\frac{1}{2}N} \sum_{m=-\frac{1}{2}M+1}^{\frac{1}{2}M} \exp(-js\alpha_n x_{1,q}^R - js\beta_m x_{2,r}^R) 2 \sinh(s\Gamma_{n,m} x_3^R) P_{n,m}^{dgh} =$$

$$p^{sct}(x_{1,q}^R, x_{2,r}^R, x_3^R; s), \; q = -\frac{1}{2}N+1, \ldots,$$

$$\frac{1}{2}N, \; r = -\frac{1}{2}M+1, \ldots, \frac{1}{2}M.$$

The deghosting for constant $x_3^R$ can be carried out explicitly in the spectral domain. The deghosted field in the spectral domain at zero depth level, $p_{n,m}^{dgh}$ as defined in Equation (7), can be obtained directly as:

$$P_{n,m}^{dgh} = \frac{P_{n,m}^{sct}}{2 \sinh(s\Gamma_{n,m} x_3^R)}. \qquad (14)$$

For the solution of the general set of linear equations in Equation (10), many efficient solvers are available, such as direct solvers and iterative solvers. A very efficient iterative solver is a preconditioned conjugate gradient iterative method based on the minimization of the discrepancies between the measured data and the modelled response. In a further embodiment of the invention, Equation (5) is considered and a solution to the spectral deghosted wavefield $p_{n,m}^{dgh}$ is developed employing a conjugate gradient iterative scheme, such that the error ERR given by:

$$ERR = \sum_{q=-\frac{1}{2}N+1}^{\frac{1}{2}N} \sum_{r=-\frac{1}{2}M+1}^{\frac{1}{2}N} \left| p_{q,r}^{sct} - \sum_{n=-\frac{1}{2}N+1}^{\frac{1}{2}N} \sum_{m=-\frac{1}{2}M+1}^{\frac{1}{2}M} K_{q,r;n,m} P_{n,m}^{dgh} \right|^2 \qquad (15)$$

is minimized.

Returning to FIG. 3, in block 32, the normal equations from block 31 are preconditioned with a physically-based preconditioner. A preconditioner is often used in conjugate gradient iterative methods to make the equations well-conditioned. Standard preconditioners, such as multi-level ILU types, for example, are usually based on the mathematical structure of the system matrix. Unfortunately, for the present problem, these mathematics-based preconditioners are inefficient. In an embodiment of the invention, a preconditioner is used which is based on the physics of the problem being solved, a non-horizontal streamer.

Since an irregular non-horizontal streamer can be considered as a perturbation of a regular horizontal streamer, the inverse of the system matrix of an irregular streamer is approximated by the inverse of the system matrix of a horizontal streamer. Hence, the inverse of the system matrix of an equivalent horizontal streamer is taken as preconditioner. Note that if the streamer is horizontal, then the conjugate gradient iterative scheme terminates within a single iteration with this preconditioner. For a horizontal streamer, the system of normal equations of Equation (10) is diagonal and the solution is directly obtained as:

$$P_{n,m}^{dgh} = [A_{n,m;n,m}]^{-1} B_{n,m} \quad (16)$$

In an embodiment of the invention, the preconditioner $\tilde{P}_{n,m}$ employed is:

$$\tilde{P}_{n,m} = [A_{n,m;n,m}]^{-\frac{1}{2}} = \left( \sum_{q=-\frac{1}{2}N+1}^{\frac{1}{2}N} \sum_{r=-\frac{1}{2}M+1}^{\frac{1}{2}M} |K_{q,r;n,m}|^2 \right)^{-\frac{1}{2}} \quad (17)$$

For convenience, Equation (5) can be written in the compact form:

$$\sum_n K_{q,n} P_n^{dgh} = p_q^{sct}, \quad (18)$$

where n stands for (n,m) and q stands for (q,r) now.

In bock 33, a preconditioned conjugate gradient iterative scheme is applied to solve the system of equations in Equation (18), the preconditioned normal set of equations from block 32. In each iteration, designated with number k, an approximate value of the spectral deghosted wavefield $P_n^{dgh}$ (k) is obtained with a residual error $r_q^{(k)}$. Thus, at the $k^{th}$ iteration, the $k^{th}$ residual error is given by:

$$r_q^{(k)} = p_q^{sct} - \sum_n K_{q,n} P_n^{dgh(k)}. \quad (19)$$

A particular embodiment of the invention for a preconditioned conjugate gradient iterative scheme is described below with reference to the discussion of the flowchart in FIG. 4.

In block 34, it is determined if any frequencies selected in block 24 of FIG. 2 remain. If frequencies remain, the process returns to block 24 of FIG. 2. If no frequencies remain, then the process continues on to step 35. Hence, the solution by conjugate gradient iterations is repeated for each frequency f.

In block 35, it is determined if any shots selected in block 22 of FIG. 2 remain. If shots remain, the process returns to block 22 of FIG. 2. If no shots remain, then the process continues on to step 36. Hence, the solution by conjugate gradient iterations is repeated for each shot.

In block 36, the deghosted solutions from block 33 are transformed from the spectral domain back to the space-time domain. After obtaining the deghosted wavefield in the spectral domain, the deghosted wavefield, $p^{dgh} = p^{dgh}(x_{1,q}^R, x_{2,q}^R, 0; s)$, at zero level in the space-time domain is obtained as:

$$p^{dgh} = \frac{\Delta(s\alpha)\Delta(s\beta)}{4\pi^2} \sum_{n=-\frac{1}{2}N+1}^{\frac{1}{2}N} \sum_{m=-\frac{1}{2}M+1}^{\frac{1}{2}M} \exp(-js\alpha_n x_{1,q}^R - js\beta_m x_{2,r}^R) P_{n,m}^{dgh}. \quad (20)$$

Figure 4:
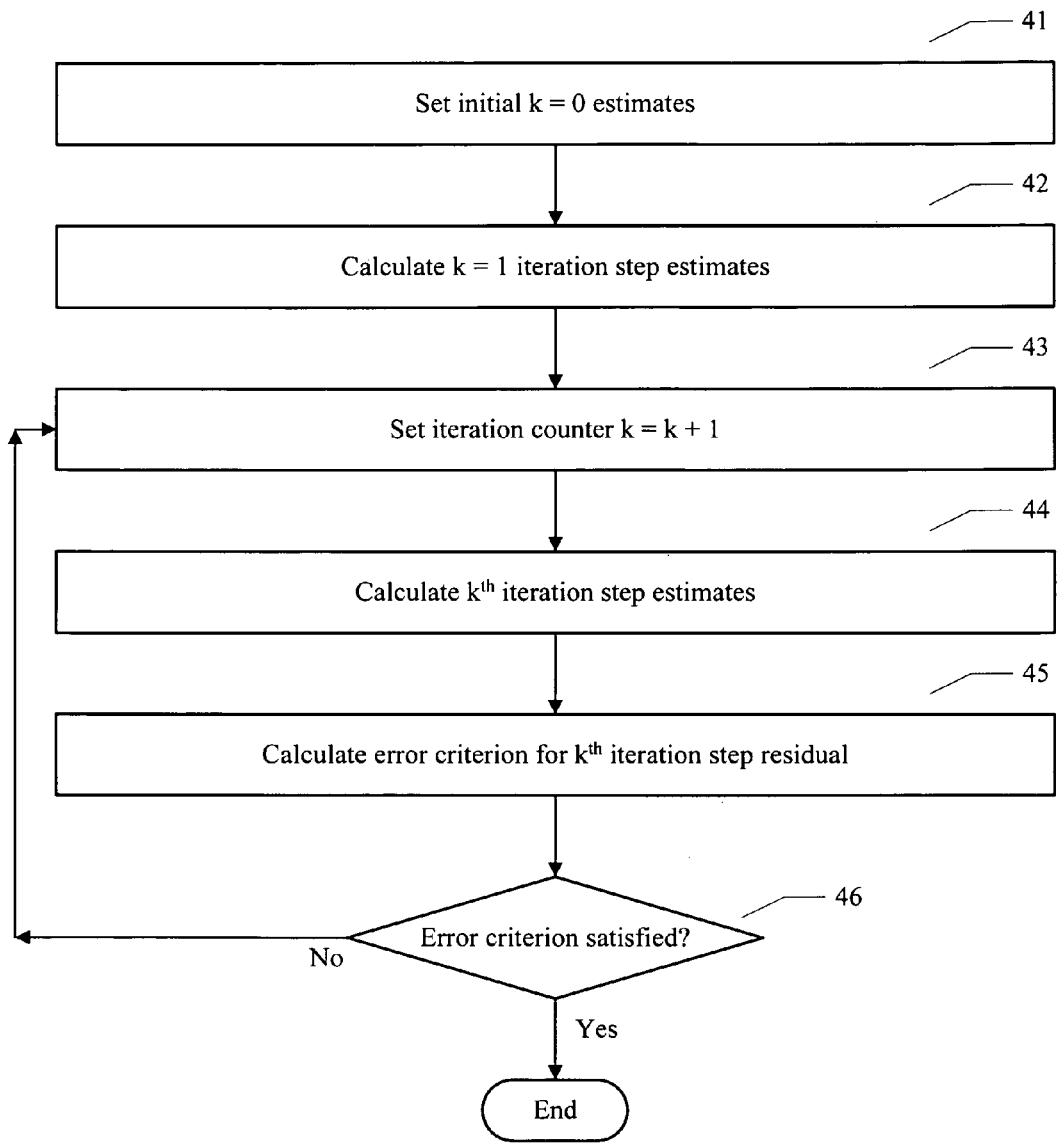
FIG. 4 is a flowchart illustrating an embodiment of the invention for an iterative preconditioned conjugate gradient scheme.

FIG. 4 is a flowchart illustrating an embodiment of the invention for an iterative preconditioned conjugate gradient scheme. This is the scheme referred to in block 33 of FIG. 3, above.

In block 41, a zero initial estimate for iteration counter k=0 is selected. In one embodiment, this estimate is:

$$P_n^{dgh(0)} = 0, \; r_q^{(0)} = p_q^{sct}. \quad (21)$$

In other embodiments, different choices for the initial estimate of the conjugate gradient scheme may be used. For example, the different choices can include, but are not limited to, the solution obtained for a previous frequency or the solution for a different shot position.

In block 42, an estimate for iteration counter k=1 is calculated. In one embodiment, these estimates are:

$$g_n^{(1)} = \tilde{P}_n \sum_q \overline{K_{q,n}} r_q^{(0)}, \quad v_n^{(1)} = \tilde{P}_n g_n^{(1)}, \quad (22)$$

$$Kv_n^{(1)} = \sum_n K_{q,n} v_n^{(1)}, \quad \alpha^{(1)} = \frac{\sum_n |g_n^{(1)}|^2}{\sum_q |Kv_n^{(1)}|^2},$$

$$P_n^{dgh(1)} = P_n^{dgh(0)} + \alpha^{(1)} v_n^{(1)}, \quad r_q^{(1)} = r_q^{(0)} - \alpha^{(1)} Kv_n^{(1)}.$$

In block 43, the iteration counter k is increased by 1. Thus, k=k+1, yielding k=2, 3, . . . , sequentially.

In block 44, an estimate for iteration counter k is calculated, using estimates for iteration counter k-1. In one embodiment, this estimate is:

$$g_n^{(k)} = \tilde{P}_n \sum_q \overline{K_{q,n}} r_q^{(k-1)}, \quad v_n^{(k)} = \tilde{P}_n g_n^{(k)} + \frac{\sum_n |g_n^{(k)}|^2}{\sum_n |g_n^{(k-1)}|^2} v_n^{(k)}, \quad (23)$$

$$Kv_n^{(k)} = \sum_n K_{q,n} v_n^{(k)}, \quad \alpha^{(k)} = \frac{\sum_n |g_n^{(k)}|^2}{\sum_q |Kv_n^{(k)}|^2},$$

$$P_n^{dgh(k)} = P_n^{dgh(k-1)} + \alpha^{(k)} v_n^{(k)}, \quad r_q^{(k)} = r_q^{(k-1)} - \alpha^{(k)} Kv_n^{(k)}.$$

In block 45, an error criterion is calculated for the current $k^{th}$ iteration estimate of the residual $r_q^{(k)}$ from block 44. In one embodiment, this error criterion is:

$$\frac{\sum_q |r_q^{(k)}|^2}{\sum_q |p_q^{sct}|^2} < 10^{-3}. \quad (24)$$

In block 46, it is determined if the error criterion in block 45 is satisfied. If the error criterion is not satisfied, then the iterative process returns to block 43 to continue with another set of estimates. If the error criterion is satisfied, then the iterative process ends.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

We claim:

1. A method for deghosting seismic data recorded from marine streamers with irregular receiver positions, comprising:

obtaining seismic data for a seismic source activation and for a frequency after being transformed to a spectral domain;

applying an iterative conjugate gradient scheme, using a preconditioner constructed according to a physical problem of deghosting seismic data from marine streamers, to the transformed seismic data, to provide a least squares solution to a normal set of equations for a deghosting system of equations; and inverse-transforming the solution back to a space-time domain to provide deghosted seismic data.

2. The method of claim 1, wherein the obtaining seismic data comprises:

obtaining seismic data recorded with a marine streamer;

obtaining recorded seismic data for a seismic source activation;

transforming the recorded seismic data for a seismic source activation from the space-time domain to the space-frequency domain;

obtaining transformed seismic data for a frequency; and transforming the transformed seismic data for a frequency from the space-frequency domain to the spectral domain.

3. The method of claim 2, wherein the transforming the recorded seismic data comprises:

transforming the scattered acoustic wavefield from the space-time $(x_1^R, x_2^R, x_3^R, t)$ domain to the space-frequency $(x_1^R, x_2^R, x_3^R, s)$ domain using a Fourier transform, so:

$$p^{sct} = p^{sct}(x_{1,q}^R, x_{2,r}^R, x_3^R; s)$$

where $$s = j\omega = j2\pi f,$$

and $p^{sct}$ is the scattered acoustic wavefield in the space-frequency domain, $x_{1,q}^R$ is an in-line receiver coordinate, q is an in-line receiver number, $x_{2,r}^R$ is a cross-line receiver coordinate, r is a cross-line receiver number, $x_3^R$ is receiver depth as a function of $x_{1,q}^R$ and $x_{2,r}^R$, s is a complex Laplace transform parameter, j is imaginary unit $\sqrt{-1}$, $\omega$ is circular frequency, and f is frequency.

4. The method of claim 3, wherein the transforming the transformed seismic data comprises:

transforming the scattered wave field $p^{sct}$ from the space-frequency domain $(x_1^R, x_2^R, x_3^R, s)$ to the spectral domain $(s\alpha_n, s\beta_m, x_3^R, s)$ by:

$$P_{n,m}^{sct} = \Delta x_1^R \Delta x_2^R \sum_{q=-\frac{1}{2}N+1}^{\frac{1}{2}N} \sum_{r=-\frac{1}{2}M+1}^{\frac{1}{2}M} \exp(js\alpha_n x_{1,q}^R + js\beta_m x_{2,r}^R) p^{sct},$$

where:

$$s\alpha_n = n\Delta(s\alpha), \quad s\beta_m = m\Delta(s\beta),$$

and:

$$\Delta(s\alpha) = \frac{2\pi}{N\Delta x_1^R}, \quad \Delta(s\beta) = \frac{2\pi}{M\Delta x_2^R},$$

and $P_{n,m}^{sct}$ is the scattered acoustic wavefield in the spectral domain, n is an in-line spectral number, m is a cross-line spectral number, $\Delta x_1^R$ is in-line receiver sampling distance, $\Delta x_2^R$ is cross-line receiver sampling distance, $js\alpha_n$ is an in-line spectral Fourier parameter, $\Delta(s\alpha)$ is in-line spectral sampling distance, $js\beta_m$ is a cross-line spectral Fourier parameter, $\Delta(s\beta)$ is cross-line spectral sampling distance, N is total number of in-line receivers, and M is total number of cross-line receivers.

5. The method of claim 4, further comprising:

determining a system of equations for deghosting the transformed seismic data for a frequency;

determining a normal set of equations for the deghosting system of equations; and applying the constructed preconditioner to the normal set of equations.

6. The method of claim 5, wherein the determining a system of equations for deghosting comprises applying the following equation:

$$\sum_{n=-\frac{1}{2}N+1}^{\frac{1}{2}N} \sum_{m=-\frac{1}{2}M+1}^{\frac{1}{2}M} K_{q,r;n,m} P_{n,m}^{tgh} = p_{q,r}^{sct},$$

$$q = -\frac{1}{2}N + 1, \ldots, \frac{1}{2}N,$$

$$r = -\frac{1}{2}M + 1, \ldots, \frac{1}{2}M,$$

in which the system matrix $K_{q,r;n,m}$ is given by $$K_{q,r;n,m} =$$

$$\frac{\Delta(s\alpha)\Delta(s\beta)}{4\pi^2} \sum_{n=-\frac{1}{2}N+1}^{\frac{1}{2}N} \sum_{m=-\frac{1}{2}M+1}^{\frac{1}{2}M} \exp(-js\alpha_n x_{1,q}^R - js\beta_m x_{2,r}^R) 2\sinh(s\Gamma_{n,m} x_3^R).$$

7. The method of claim 6, wherein the determining a normal set of equations comprises applying the following equation:

$$\sum_{n=-\frac{1}{2}N+1}^{\frac{1}{2}N} \sum_{m=-\frac{1}{2}M+1}^{\frac{1}{2}M} A_{n',m';n,m} P_{n,m}^{tgh} = B_{n',m'},$$

$$n' = -\frac{1}{2}N + 1, \ldots, \frac{1}{2}N, \quad m' = -\frac{1}{2}M + 1, \ldots, \frac{1}{2}M,$$

where, the matrix $A_{n',m';n,m}$ is given by $$A_{n',m';n,m} = \sum_{q=-\frac{1}{2}N+1}^{\frac{1}{2}N} \sum_{r=-\frac{1}{2}M+1}^{\frac{1}{2}M} \overline{K_{q,r;n',m'}} K_{q,r;n,m},$$

the known vector $B_{n',m'}$ is given by $$B_{n',m'} = \sum_{q=-\frac{1}{2}N+1}^{\frac{1}{2}N} \sum_{r=-\frac{1}{2}M+1}^{\frac{1}{2}M} \overline{K_{q,r;n',m'}} p_{q,r}^{sct},$$

and n and n' are in-line spectral numbers, m and m' are cross-line spectral numbers, and the overline designates complex conjugation.

8. The method of claim 6, wherein the preconditioner comprises an inverse of the system matrix for a horizontal streamer.

9. The method of claim 8, wherein the applying a preconditioner comprises applying the following equation:

$$\check{P}_{n,m} = [A_{n,m;n,m}]^{-\frac{1}{2}} = \left( \sum_{q=-\frac{1}{2}N+1}^{\frac{1}{2}N} \sum_{r=-\frac{1}{2}M+1}^{\frac{1}{2}M} |K_{q,r;n,m}|^2 \right)^{-\frac{1}{2}}.$$

10. The method of claim 1, wherein the applying an iterative conjugate gradient scheme comprises:

selecting an initial estimate for iteration counter k=0, as follows:

$$P_n^{dgh(0)}=0, \; r_q^{(0)}=P_q^{sct},$$

calculating estimates for iteration counter k=1, as follows:

$$g_n^{(1)} = \check{P}_n \sum_q \overline{K_{q,n}} r_q^{(0)}, \qquad v_n^{(1)} = \check{P}_n g_n^{(1)},$$

$$K v_n^{(1)} = \sum_n K_{q,n} v_n^{(1)}, \qquad \alpha^{(1)} = \frac{\sum_n |g_n^{(1)}|^2}{\sum_q |K v_n^{(1)}|^2},$$

$$P_n^{dgh(1)} = P_n^{dgh(0)} + \alpha^{(1)} v_n^{(1)}, \quad r_q^{(1)} = r_q^{(0)} - \alpha^{(1)} K v_n^{(1)},$$

performing the following until an error criterion is met:
increasing the iteration counter by k=k+1; and
calculating estimates for iteration counter k, using previous estimates calculated for k−1, as follows:

$$g_n^{(k)} = \check{P}_n \sum_q \overline{K_{q,n}} r_q^{(k-1)}, \qquad v_n^{(k)} = \check{P}_n g_n^{(k)} + \frac{\sum_n |g_n^{(k)}|^2}{\sum_n |g_n^{(k-1)}|^2} v_n^{(k)},$$

$$K v_n^{(k)} = \sum_n K_{q,n} v_n^{(k)}, \qquad \alpha^{(k)} = \frac{\sum_n |g_n^{(k)}|^2}{\sum_q |K v_n^{(k)}|^2},$$

$$P_n^{dgh(k)} = P_n^{dgh(k-1)} + \alpha^{(k)} v_n^{(k)}, \quad r_q^{(k)} = r_q^{(k-1)} - \alpha^{(k)} K v_n^{(k)}.$$

11. The method of claim 5, wherein the error criterion is given by:

$$\frac{\sum_q |r_q^{(k)}|^2}{\sum_q |p_q^{sct}|^2} < 10^{-3}.$$

12. The method of claim 4, wherein the inverse-transforming the solution comprises applying the following equation:

$$p^{dgh} = \frac{\Delta(s\alpha)\Delta(s\beta)}{4\pi^2} \sum_{n=-\frac{1}{2}N+1}^{\frac{1}{2}N} \sum_{m=-\frac{1}{2}M+1}^{\frac{1}{2}M} \exp(-js\alpha_n x_{1,q}^R - js\beta_m x_{2,r}^R) P_{n,m}^{dgh}.$$

* * * * *